United States Patent
Takasu et al.

(10) Patent No.: US 11,869,215 B2
(45) Date of Patent: Jan. 9, 2024

(54) COMPUTER-READABLE STORAGE MEDIUM, IMAGE PROCESSING APPARATUS, AND METHOD FOR IMAGE PROCESSING

(71) Applicant: BROTHER KOGYO KABUSHIKI KAISHA, Nagoya (JP)

(72) Inventors: Masaya Takasu, Nagoya (JP); Chisato Inoue, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 275 days.

(21) Appl. No.: 17/516,015

(22) Filed: Nov. 1, 2021

(65) Prior Publication Data

US 2022/0180558 A1 Jun. 9, 2022

(30) Foreign Application Priority Data

Dec. 9, 2020 (JP) .................... 2020-204508

(51) Int. Cl.
*G06V 20/58* (2022.01)
*G06T 7/73* (2017.01)
(Continued)

(52) U.S. Cl.
CPC ............ *G06T 7/74* (2017.01); *B41J 29/38* (2013.01); *G06T 7/13* (2017.01); *G06T 7/337* (2017.01);
(Continued)

(58) Field of Classification Search
CPC .. G01N 21/6486; H04N 5/23222; G06T 7/60; G06T 5/006; G06T 7/74; G06T 7/13;
(Continued)

(56) References Cited

U.S. PATENT DOCUMENTS 10,621,463 B2 * 4/2020 Adams ................ G06F 16/50
2011/0208477 A1 8/2011 Hitomi et al.
(Continued)

FOREIGN PATENT DOCUMENTS

JP H06-083961 A 3/1994
JP H11-063959 A 3/1999
(Continued)

OTHER PUBLICATIONS

First U.S Office Action dated Jan. 17, 2023, U.S. Appl. No. 17/516,094.

*Primary Examiner* — Phuoc H Doan
(74) *Attorney, Agent, or Firm* — Baker Botts L.L.P.

(57) ABSTRACT

A non-transitory computer readable storage medium storing computer readable instructions executable by a computer is provided. The computer readable instructions cause the computer to obtain first image data composing a first image and second image data composing a second image, specify first edge pixels in the first image using the first image and second edge pixels in the second image using the second image data, determine positional relation between the first image and the second image in a first degree of accuracy, based on positional relation between the first edge pixels and the second edge pixels, determine first usable pixels among the first edge pixels and the second usable pixels among the second edge pixels, and using the first usable pixels and the second usable pixels, determine positional relation between the first image and the second image in a second degree of accuracy being higher than the first degree.

10 Claims, 8 Drawing Sheets

(51) Int. Cl.
*G06T 7/13* (2017.01)
*B41J 29/38* (2006.01)
*G06T 7/33* (2017.01)
G06K 15/10 (2006.01)
G06K 15/02 (2006.01)

(52) U.S. Cl.
CPC ......... *G06K 15/021* (2013.01); *G06K 15/102* (2013.01)

(58) Field of Classification Search
CPC .. G06K 9/4609; G06K 9/6211; G06V 10/443; G06V 10/757; G01T 1/247
See application file for complete search history.

(56) References Cited

U.S. PATENT DOCUMENTS

| | | |
|---|---|---|
| 2013/0002828 A1 | 1/2013 | Ding et al. |
| 2016/0012304 A1 | 1/2016 | Mayle et al. |
| 2017/0148154 A1 | 5/2017 | Nakao |
| 2021/0031538 A1* | 2/2021 | Nakagawa ........... G06K 15/102 |

FOREIGN PATENT DOCUMENTS

| | | |
|---|---|---|
| JP | 2006-113931 A | 4/2006 |
| JP | 2010-197336 A | 9/2010 |
| JP | 2012-009919 A | 1/2012 |
| JP | 2012-048593 A | 3/2012 |
| JP | 2013-114547 A | 6/2013 |
| JP | 2017-096750 A | 6/2017 |
| WO | 2010/052855 A1 | 5/2010 |

* cited by examiner

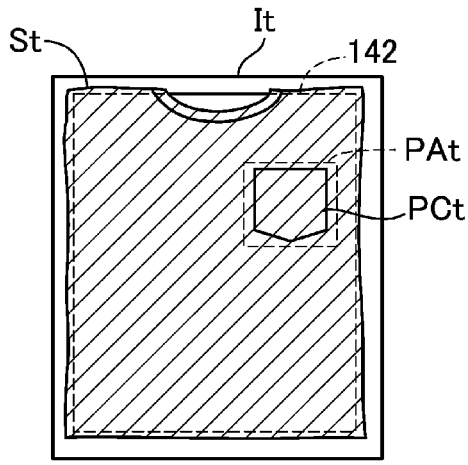
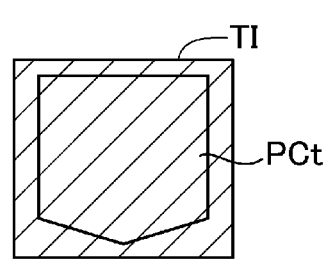
FIG. 4A  FIG. 4B  FIG. 4C
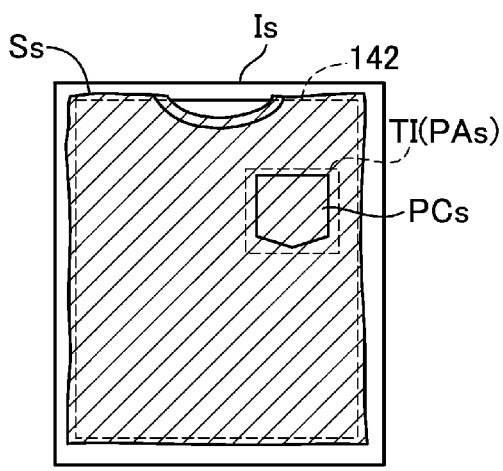
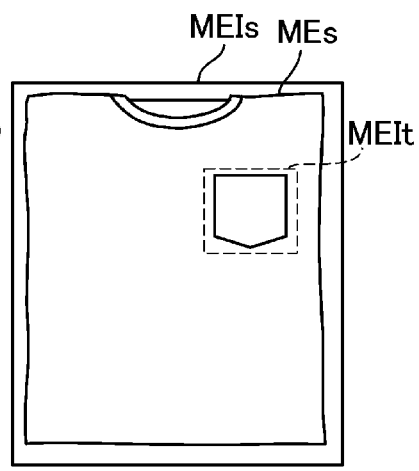
FIG. 4D  FIG. 4E  FIG. 4F

COMPUTER-READABLE STORAGE MEDIUM, IMAGE PROCESSING APPARATUS, AND METHOD FOR IMAGE PROCESSING

CROSS REFERENCE TO RELATED APPLICATIONS

This application claims priority under 35 U.S.C. § 119 from Japanese Patent Application No. 2020-204508, filed on Dec. 9, 2020, the entire subject matter of which is incorporated herein by reference.

BACKGROUND

The present disclosure is related to a technique for determining positional relation between images.

An image measuring apparatus capable of acquiring an approximate position and a posture of a mark formed on a work, is known. The image measuring apparatus may acquire the position and the posture of the mark on the work through a pattern-matching process using a captured image, which may be captured by shooting the work with the mark by a camera in a lower resolution, and a template image. The image measuring apparatus may thereafter acquire a more accurate position and posture of the mark in the captured image based on known positional relation between edge points measured on the mark in the captured image and a shape of the mark.

SUMMARY

Based on the known technique, however, occasionally, an object in the image may not be identified sufficiently accurately. For example, the technique in the known image measuring apparatus is based on a condition that the exact shape of the mark is known in advance. Therefore, for example, if the object in the image may vary within a range of individually variability, it may be difficult to determine the positional relation between the captured image and the template image accurately.

The present disclosure is advantageous in that a technique for determining positional relation between images accurately is provided.

According to an aspect of the present disclosure, a non-transitory computer readable storage medium storing computer readable instructions that are executable by a computer is provided. The computer readable instructions, when executed by the computer, cause the computer to obtain first image data composing a first image and second image data composing a second image, the second image corresponding to an object; specify a plurality of first edge pixels in the first image with use of the first image data and a plurality of second edge pixels in the second image with use of the second image data; determine positional relation between the first image and the second image in a first degree of accuracy; based on positional relation between the plurality of first edge pixels and the plurality of second edge pixels within the determined positional relation between the first image and the second image, determine a plurality of first usable pixels among the plurality of first edge pixels and a plurality of second usable pixels among the plurality of second edge pixels, a sum of the plurality of first usable pixels and the plurality of second usable pixels being smaller than a sum of the plurality of first edge pixels and the plurality of second edge pixels; and with use of the plurality of first usable pixels and the plurality of second usable pixels, determine positional relation between the first image and the second image in a second degree of accuracy, the second degree being higher than the first degree.

According to another aspect of the present disclosure, an image processing apparatus, including a memory configured to store data and a controller, is provided. The controller is configured to obtain first image data composing a first image and second image data composing a second image, the second image corresponding to an object; specify a plurality of first edge pixels in the first image with use of the first image data and a plurality of second edge pixels in the second image with use of the second image data; determine positional relation between the first image and the second image in a first degree of accuracy; based on positional relation between the plurality of first edge pixels and the plurality of second edge pixels within the determined positional relation between the first image and the second image, determine a plurality of first usable pixels among the plurality of first edge pixels and a plurality of second usable pixels among the plurality of second edge pixels, a sum of the plurality of first usable pixels and the plurality of second usable pixels being smaller than a sum of the plurality of first edge pixels and the plurality of second edge pixels; and with use of the plurality of first usable pixels and the plurality of second usable pixels, determine positional relation between the first image and the second image in a second degree of accuracy, the second degree being higher than the first degree.

According to another aspect of the present disclosure, a method to process images is provided. The method includes obtaining first image data composing a first image and second image data composing a second image, the second image corresponding to an object; specifying a plurality of first edge pixels in the first image data with use of the first image and a plurality of second edge pixels in the second image with use of the second image data; determining positional relation between the first image and the second image in a first degree of accuracy; based on positional relation between the plurality of first edge pixels and the plurality of second edge pixels within the determined positional relation between the first image and the second image, determining a plurality of first usable pixels among the plurality of first edge pixels and a plurality of second usable pixels among the plurality of second edge pixels, a sum of the plurality of first usable pixels and the plurality of second usable pixels being smaller than a sum of the plurality of first edge pixels and the plurality of second edge pixels; and with use of the plurality of first usable pixels and the plurality of second usable pixels, determining positional relation between the first image and the second image in a second degree of accuracy, the second degree being higher than the first degree.

BRIEF DESCRIPTION OF THE DRAWINGS

FIGS. 4A-4F are illustrative views of images to be used in the printing system 1000 according to the embodiment of the present disclosure.

DETAILED DESCRIPTION

In the following paragraphs, with reference to the accompanying drawings, an embodiment of the present disclosure will be described. It is noted that various connections may be set forth between elements in the following description. These connections in general and, unless specified otherwise, may be direct or indirect and that this specification is not intended to be limiting in this respect.

A. Embodiment

A-1. Configuration of the Printing System 1000

Figure 1:
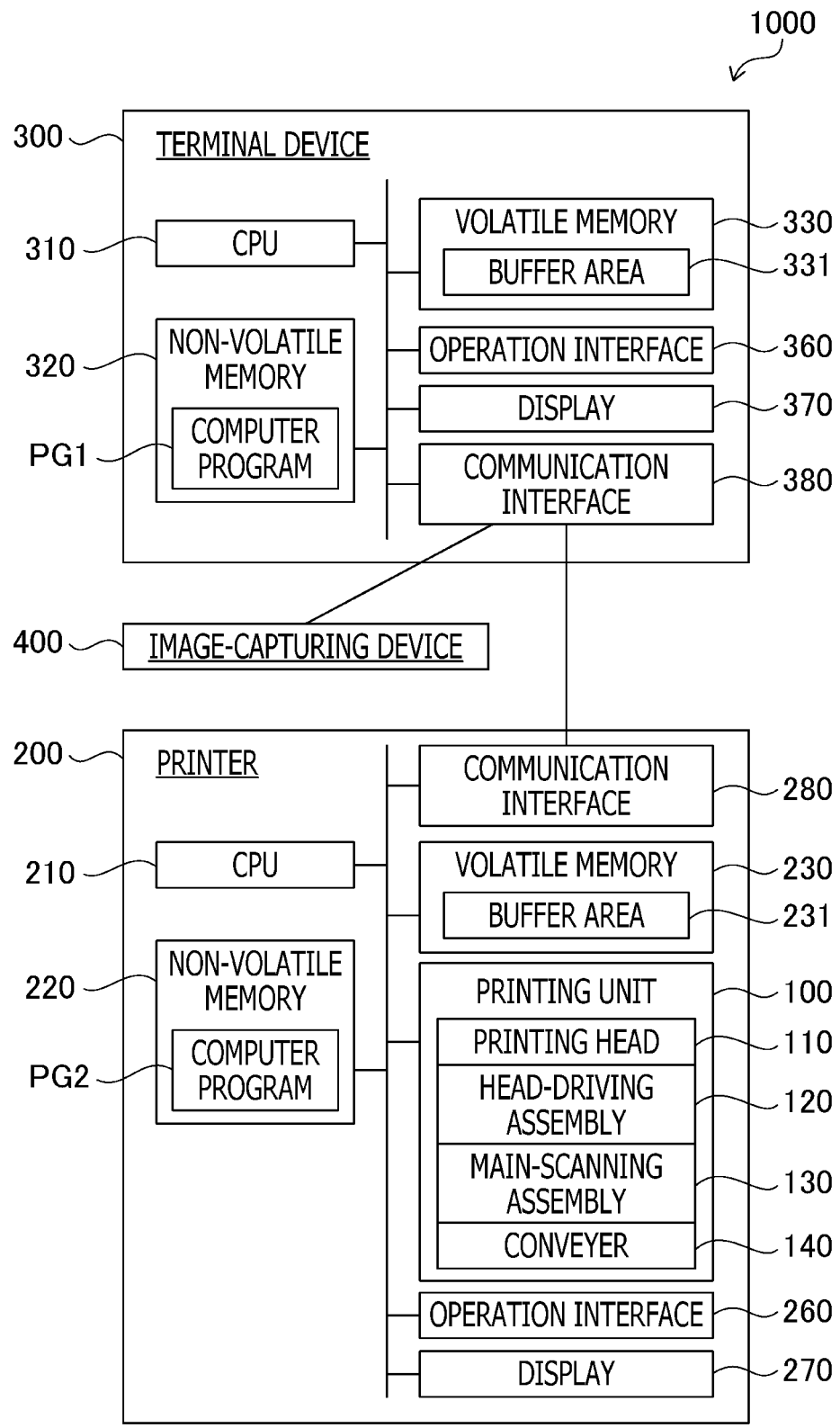
FIG. 1 is a block diagram to illustrate a configuration of a printing system 1000 according to an embodiment of the present disclosure.

The embodiment of the present disclosure will be described below. FIG. 1 is a block diagram to illustrate a configuration of the printing system 1000 according to the embodiment of the present disclosure. The printing system 1000 includes a printer 200, a terminal device 300, and an image-capturing device 400. The printer 200 and the terminal device 300 are connected to communicate with each other, and the image-capturing device 400 and the terminal device 300 are connected to communicate with each other.

The terminal device 300 is a computer, which may be used by a user of the printer 200, and may include, for example, a personal computer and a smart phone. The terminal device 300 has a CPU 310 being a controller of the terminal device 300, a non-volatile memory 320 such as a hard disk drive, a volatile memory 330 such as RAM, an operation interface 360 such as a mouse and a keyboard, a display 370 such as a liquid crystal display, and a communication interface 380. The communication interface 380 may include, for example, a wired and/or wireless interface, which enables communication with the printer 200 and the image-capturing device 400.

The volatile memory 330 has a buffer area 331 for temporarily storing various intermediate data generated when the CPU 310 processes data. The non-volatile memory 320 may store computer programs including a computer program PG1. The computer program PG1 may be provided by a manufacture of the printer 200 in a form of, for example, downloadable from a server or being stored in a medium such as, for example, a DVD-ROM. The CPU 310 executing the computer program PG1 may function as a printer driver to control the printer 200. The CPU 310 functioning as the printer driver may conduct, for example, a template registration process and a printing process, which will be described further below.

The image-capturing device 400 is a digital camera, which may optically capture an image of an object and generate image data to reproduce the image. In the following paragraphs, the generated image data of the captured image may be called as captured-image data. The image-capturing device 400 may generate and transmit the captured-image data to the terminal device 300 under control of the terminal device 300.

The printer 200 includes, for example, a printing unit 100, a CPU 210 being a controller of the printer 200, a non-volatile memory 220 such as a hard disk drive, a volatile memory 230 such as RAM, an operation interface 260 including buttons and a touch panel, through which the user's operation may be entered, a display 270 such as a liquid crystal display, and a communication interface 280. The communication interface 280 may include, for example, a wired and/or wireless interface, which enables communication with the terminal device 300.

The volatile memory 230 has a buffer area 231 for temporarily storing various intermediate data generated when the CPU 210 processes data. The non-volatile memory 220 may store computer programs including a computer program PG2. The computer program PG2 in the present embodiment is a controlling program to control the printer 200 and may be installed in the non-volatile memory 220 before being shipped to be delivered to the user. However, optionally, the computer program PG2 may be provided in a form downloadable from a server or being stored in a medium such as, for example, a DVD-ROM. The CPU 210 executing the computer program PG2 may control the printing unit 100 in accordance with printable data, which may be, for example, transmitted from the terminal device 300 in the printing process described below, to print an image on a printable medium. The printer 200 in the present embodiment may use a piece of fabric as the printable medium and may print an image on, for example, a garment S (see FIG. 2) such as a T-shirt.

The printing unit 100 may be an inkjet-printing apparatus, which prints an image by discharging droplets of inks in multiple colors such as cyan (C), magenta (M), yellow (Y), and black (K). The printing unit 100 includes a printing head 110, a head driving assembly 120, a main-scanning assembly 130, and a conveyer 140.

Figure 2:
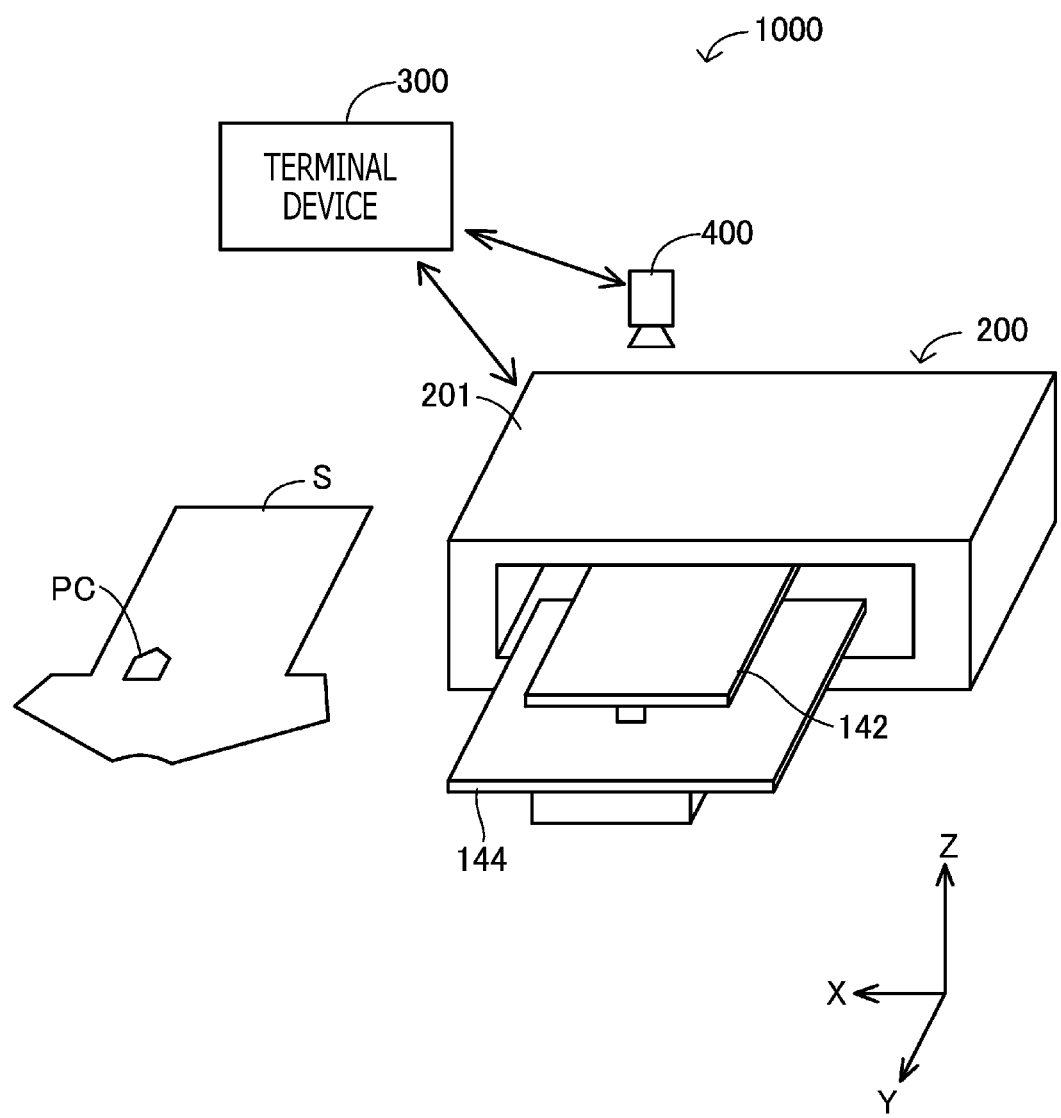
FIG. 2 is an overall illustrative view of the printing system 1000 according to the embodiment of the present disclosure.

The printing system 1000 will be described further with reference to FIG. 2. FIG. 2 is an overall illustrative view of the printing system 1000 according to the embodiment of the present disclosure. A leftward direction, a rightward direction, a frontward direction, a rearward direction, an upward direction, and a downward direction of the printer 200 may be called as +X-direction, −X-direction, +Y-direction, −Y-direction, +Z-direction, and −Z-direction, respectively, as indicated by three-dimensioned arrows in FIG. 2.

The main-scanning assembly 130 may move a carriage (not shown), on which the printing head 110 is mounted, to reciprocate inside the housing 201 in a main-scanning direction, e.g., the X-direction in FIG. 2, by use of a main-scanning motor (not shown). Thereby, a main-scanning operation, in which the printing head 110 reciprocates along the main-scanning direction, i.e., the X-direction, over the printable medium such as the garment S, may be performed.

The conveyer 140 includes a platen 142 and a tray 144, which are arranged in a central area in the X-direction in the housing 201. The platen 142 is in a form of a plate and has an upper surface, which is a surface in the +Z-direction, may serve as a loadable surface, on which the printable medium such as the garment S may be placed. The platen 142 is fixed to the tray 144, which has a form of a plate and is located on a side in the −Z-direction with respect to the platen 142. The tray 144 is substantially larger than the platen 142. The printable medium such as the garment S may be retained by the platen 142 and the tray 144. The platen 142 and the tray 144 may be conveyed in a conveying direction, e.g., the Y-direction in FIG. 2, which intersects with the main-scanning direction, by a driving force from a sub-scanning motor (not shown). Thereby, a sub-scanning operation, in which the printable medium such as the garment S may be conveyed in the conveying direction with respect to the printing head 110, may be performed.

The head driving assembly 120 (see FIG. 1) may, while the main-scanning assembly 130 performs the main-scanning operation, supply driving signals to the printing head 110 to drive the printing head 110. The printing head 110 includes a plurality of nozzles (not shown) and may discharge the ink droplets in accordance with the driving signals at the printable medium, which is being conveyed in the conveying direction by the conveyer 140, to form dots on the printable medium.

The image-capturing device 400 as shown in FIG. 2 is supported by a supporting tool (not shown) and is arranged on a side of the printer 200 in the +Z-direction. The image-capturing device 400 may be located at a position apart from the printer 200 and is arranged to face the upper surface of the platen 142 to capture an image of the printable medium such as the garment S placed on the upper surface of the platen 142. Thereby, the image-capturing device 400 may generate the captured-image data composing the image of the printable medium such as the garment S.

A-2. Actions in Printing System 1000

Actions performable in the printing system 1000 will be described below. The printing system 1000 may print a predetermined image, e.g., pattern, logo, etc., in a printable area being a part of the printable medium, e.g., the garment S. The garment S in the present embodiment is, as shown in FIG. 2, a T-shirt, and the printable area is an area including a chest pocket PC arranged on the T-shirt. The garment S may be, for example, placed on the platen 142 by a worker. However, it may be difficult for the worker to place the garment S on the platen 142 to locate the chest pocket PC at an exact same position on the platen 142 each time as the worker handles a plurality of garments S one after another. In this regard, the printing system 1000 provides a function to specify an area, which contains the chest pocket PC of the garment S placed on the platen 142 as the printable area, and to print the image on the specified printable area.

A-2-1. Template Registration Process

A template registration process is a process to generate template image data to be used in the printing process for specifying the printable area, in which the chest pocket PC is located, with use of a sample garment S. The printing process will be described further below. The sample garment S may be, for example, one of a plurality of garments S for the workers to print the image thereon.

Figure 3A:
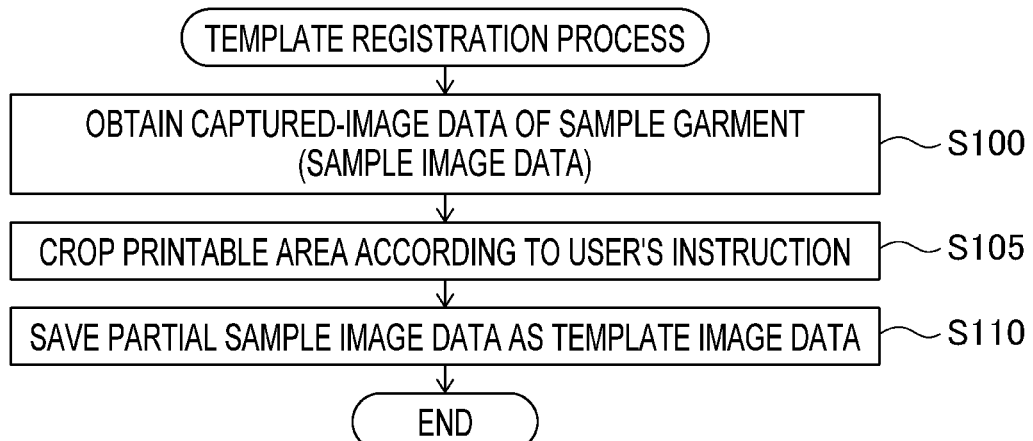
FIG. 3A is a flowchart to illustrate a flow of steps in a template registration process to be conducted in the printing system 1000 according to the embodiment of the present disclosure.

FIG. 3A is a flowchart to illustrate a flow of steps in the template registration process to be conducted in the printing system 1000. The template registration process may start, for example, while the sample garment S is set on the platen 142 and the image-capturing device 400 is ready to capture an image of the garment S on the platen 142 from above, and when the user inputs a start command in the terminal device 300. The template registration process may be conducted by the CPU 310 of the terminal device 300.

In S100, the CPU 310 obtains captured-image data of the sample garment S from the image-capturing device 400. In particular, the CPU 310 may transmit an image-capturing command to the image-capturing device 400. The image-capturing device 400 may capture the image of the sample garment S set on the platen 142, generate captured-image data composing the captured image, and transmit the generated captured-image data to the terminal device 300. The captured-image data may be, for example, a unit of image data including RGB values, each of which corresponds to one of a plurality of pixels and indicates a color of the pixel, composing the captured image. The RGB value is a value of a color in an RGB-color system containing three component values of R, G, and B. The captured-image data composing the image of the sample garment S obtained in S100 may be hereinafter called as sample image data, and the image composed of the sample image data may be called as a sample image.

FIGS. 4A-4F illustrate images to be used in the printing system 1000 according to the embodiment of the present disclosure. As shown in FIGS. 4A-4F, a left-right direction of each image corresponds to the main-scanning direction of the printer 200 (i.e., the X direction in FIG. 2), and an up-down direction of the image corresponds to the conveying direction of the printer 200 (i.e., the Y direction in FIG. 2). FIG. 4A shows an example of a sample image It as composed of the sample image data. The sample image It includes an image representing the sample garment S placed on the platen 142. In the following paragraphs, the image representing the sample garment S included in the sample image It may be called as "garment St," and an image indicating the chest pocket PC may be called as "chest pocket PCt."

In S105, the CPU 310 crops a printable area PAt from the sample image It based on an instruction by the user. For example, the CPU 310 may display a user interface (UI) screen (not shown) through the display 370. The user may enter an instruction to designate the printable area PAt in the sample image It on the UI screen through a pointing device such as a mouse. The example in FIG. 4A shows the printable area PAt containing the chest pocket PC of the garment St. The CPU 310 conducts a cropping process to the sample image data and generates partial sample image data corresponding to the printable area PAt.

In S110, the CPU 310 saves the partial sample image data in the non-volatile memory 220 as template image data. FIG. 4B shows an example of a template image TI as composed of the template image data, i.e., the partial sample image data.

A-2-2. Printing Process

Figure 3B:
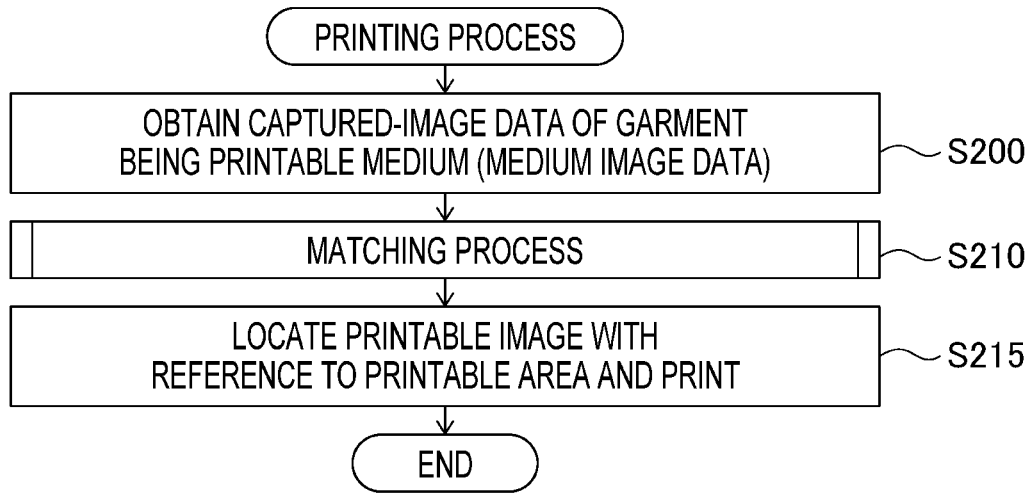
FIG. 3B is a flowchart to illustrate a flow of steps in a printing process to be conducted in the printing system 1000 according to the embodiment of the present disclosure.

The printing process is a process, in which a predetermined image, e.g., pattern, logo, etc., is printed in the printable area being a part of the garment S as the printable medium. FIG. 3B is a flowchart to illustrate a flow of steps in the printing process. The printing process may start, while the garment S as the printable medium is set on the platen 42 and the image-capturing device 400 is ready to capture an image of the garment S on the platen 142 from above, when the user inputs a start command in the terminal device 300. The printing process may be conducted by the CPU 310 of the terminal device 300.

In S200, the CPU 310 obtains captured-image data of the garment S as the printable medium from the image-capturing device 400. The captured-image data may be obtained in the same manner as the captured-image data of the sample garment S obtained in S100 in FIG. 3A. In the following paragraphs, the captured-image data composing the image of the garment S as the printable medium obtained in S200 may be called as medium image data, and the image composed of the medium image data may be called as a medium image.

FIG. 4D shows an example of a medium image Is as composed of the medium image data. The medium image Is includes an image representing the garment S set on the platen 142, similarly to the sample image It. In the following paragraphs, the image representing the garment S included in the medium image Is may be called as "garment Ss," and the image representing the chest pocket Pc in the garment Ss may be called as "chest pocket PCs."

In S210, the CPU 310 conducts a matching process and specifies a printable area PAs in the medium image Is. The matching process may be conducted with use of the medium image data and the template image data. The matching process is a process, in which positional relation between the medium image Is and the template image TI is determined. The matching process will be described further below.

The positional relation between the medium image Is and the template image TI may be indicated by, for example, a position (coordinates) of the template image TI with respect to the medium image Is and inclination (angle) of the template image TI with respect to the medium image Is. The positional relation may further include largeness (scale) of the template image TI with respect to the medium image Is. In FIG. 4D, a rectangle drawn in a broken line represents an area of the template image TI arranged over the medium image Is according to the positional relation specified in the matching process. The CPU 310 specifies the printable area PAs based on the specified positional relation. For example, the area of the template image TI arranged over the medium image Is according to the specified positional relation may be specified as the printable area PAs (see FIG. 4D).

In S215, the CPU determines a position of the printable image, e.g., pattern, logo, etc., with respect to the specified printable area PAs and prints the image therein. For example, the CPU 310 may generate printable data, which may cause the printable image to be printed in an area, corresponding to the printable area PAs specified in the medium image IS, e.g., an area of the chest pocket PC, on the garment S and transmit the generated printable data to the printer 200. The printer 200 controls the printing unit 100 in accordance with the received printable data to print the image on the garment S.

A-2-3. Matching Process

Figure 5:
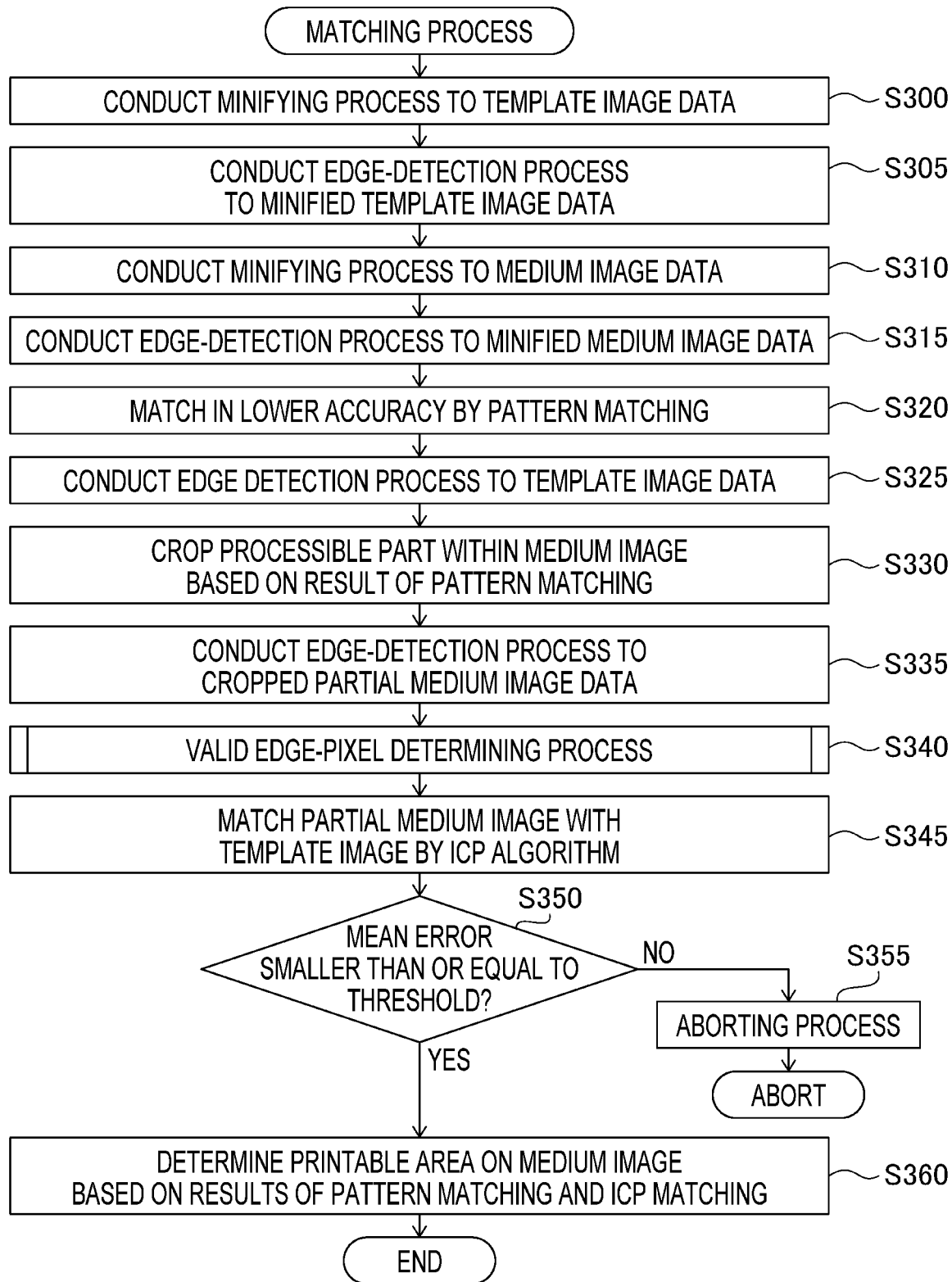
FIG. 5 is a flowchart to illustrate a flow of steps in a matching process to be conducted in the printing system 1000 according to the embodiment of the present disclosure.

The matching process in S210 in FIG. 3B will be herein described with reference to FIG. 5. FIG. 5 is a flowchart to illustrate a flow of steps in the matching process. In S300, the CPU 310 conducts a minifying process to the template image data to generate minified template image data. The minifying process is a process to reduce a number of pixels in the X-direction and a number of pixels in the Y-direction in a subject image at a predetermined minifying ratio. The minifying process may be conducted with use of a known method such as, for example, the nearest neighbor method, the bilinear method, and the bicubic method. The predetermined minifying ratio may be, for example, 10-50%.

In S305, the CPU 310 conducts an edged-detection process to the minified template image data to generate minified template edge data. The edge-detection process is a process to detect edge pixels in a plurality of pixels in the subject image and generate edge data describing the detected result. The edge data is a binary image data indicating each pixel is either an edge pixel or a non-edge pixel.

The edge pixels may be detected by various methods. The present embodiment uses the Canny Edge method, which may be preferred for detecting edge pixels that form contours of objects in an image. Optionally, for another example, a Laplacian filter or a Sobel filter may be used to calculate edge intensity, and pixels, of which edge intensity is greater than a threshold TH1, may be detected as edge pixels.

FIG. 4C shows a minified template edge image MEIt as composed of the minified template edge data. The minified template edge image MEIt includes edges MEt of the contours of the chest pocket PCt in the template image TI in FIG. 4B.

In S310, the CPU 310 conducts the minifying process to the medium image data to generate minified medium image data. The minifying process in S310 is conducted in the same manner as the minifying process to the template image data in S300, and the minifying ratio in the minifying process in S310 is the same minifying ratio as the minifying process in S300.

In S315, the CPU 310 conducts the edge-detection process to the minified medium image data to generate minified medium edge data. The edge-detection process in S315 uses the same method as the edge-detection process in S305.

FIG. 4E shows a minified medium edge image MEIs as composed of the minified medium edge data. The minified medium edge image MEIs includes edges MEs of the contours of the garment Ss and the chest pocket PCs in the medium image Is shown in FIG. 4D.

In S320, the CPU 310 conducts matching in a lower degree of accuracy with use of pattern matching. In particular, the CPU 310 may roughly determine positional relation between the minified medium edge image MEIs and the minified template edge image MEIt with use of the minified medium edge data and the minified template edge data. For the pattern matching, known algorithms may be used. The pattern matching may be, for example, a method to search for most-matched positional relation between the minified medium edge image MEIs and the minified template edge image MEIt, in which a degree of similarity between the minified medium edge image MEIs and the minified template edge image MEIt is highest, by changing the positional relation (coordinates and angles) between the minified medium edge image MEIs and the minified template edge image MEIt by a predetermined increment, and in an area where the minified medium edge image MEIs and the minified template edge image MEIt overlap, by calculating the degree of similarity between the minified medium edge image MEIs and the minified template edge image MEIt. The degree of similarity between the minified medium edge image MEIs and the minified template edge image MEIt may be determined, for example, based on a number of edge pixels in the minified medium edge image MEIs that overlap the edge pixels in the minified template edge image MEIt.

The degree of accuracy for matching may depend on the amount of increment. In S320, for example, the increment in the coordinates may be set within a range between 1 pixel and a few pixels, and the increment in the angle may be set within a range between 3 degrees and 7 degrees.

In FIG. 4E, a rectangle drawn in a broken line represents the minified template edge image MEIt arranged over the minified medium edge image MEIs within the positional relation determined through the pattern matching.

In S325, the CPU 310 conducts the edge-detection process to the template image data, which is original and not minified, to generate template edge data. The edge-detection process may use, for example, the Canny Edge method, similarly to the edge-detection process in S305. Optionally, for another example, a method with use of various detecting filters may be used.

Figure 6A:
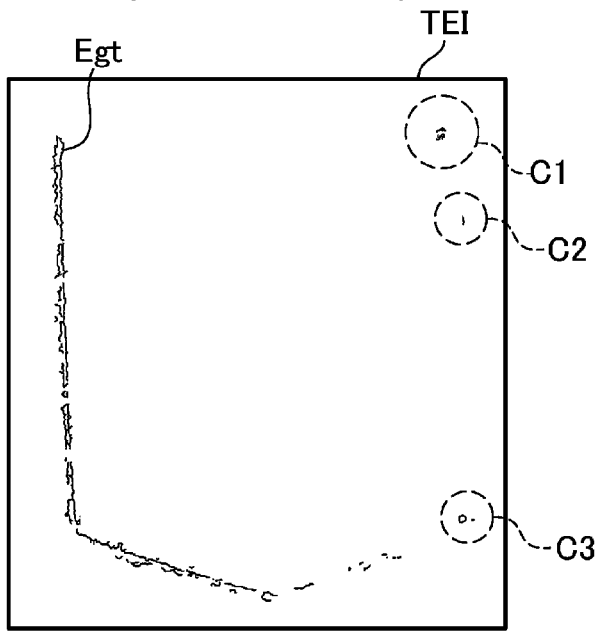
FIGS. 6A-6C are illustrative views of edge images to be used in the matching process in the printing system 1000 according to the embodiment of the present disclosure.
Figure 6B:
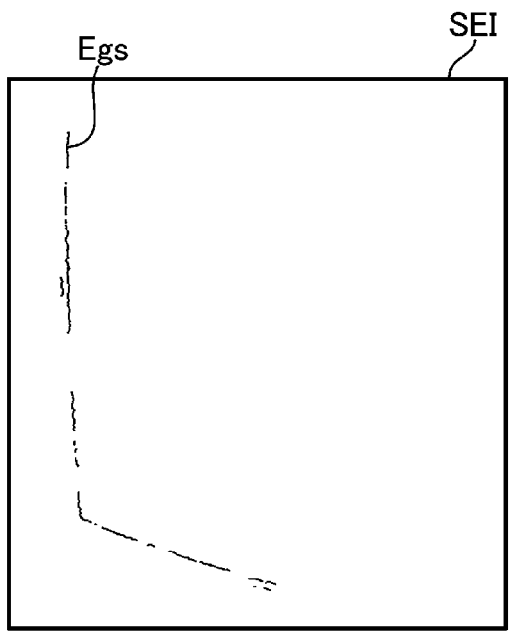
Figure 6C:
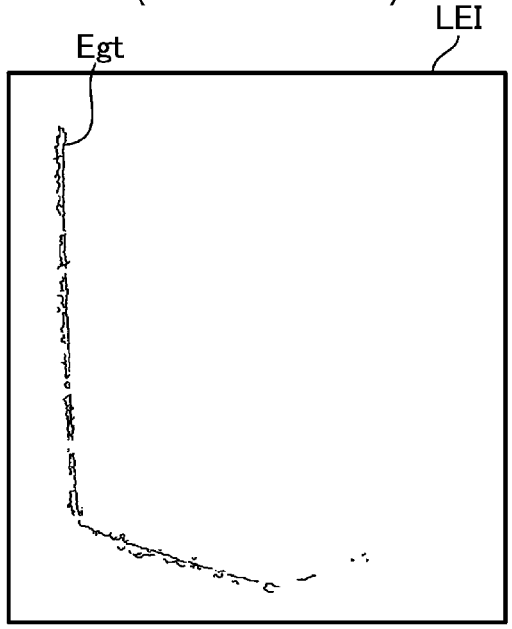

FIGS. 6A-6C illustrate the edge images to be used in the matching process. FIG. 6A illustrates a template edge image TEI as composed of the template edge data. In the template edge image TEI, edge pixels Egt contained in the template image TI (see FIG. 4B) are specified.

In S330, based on the result of the pattern matching performed in S320 using the minified medium edge image MEIs and the minified template edge image MEIt, the CPU 310 crops a part of the medium image Is before being minified as a subject to be processed. In particular, the CPU 310 specifies positional relation between the medium image Is and the template image TI, which are not minified, based on the positional relation between the minified medium edge image MEIs and the minified template edge image MEIt specified in S320. The CPU 310 crops an area in the medium image Is that overlaps the template image TI in the specified positional relation and generates partial medium image data.

FIG. 4F illustrates a partial medium image SI as composed of the partial medium image data generated by cropping the area in the medium image Is in S330. The partial medium image SI in FIG. 4F is a part of the medium image Is that includes the chest pocket PCs.

In S335, the CPU 310 conducts the edge-detection process to the partial medium image data generated by the cropping in S330. The edge-detection process may use, for example, the Canny Edge method, similarly to the edge-detection process in S305. However, optionally, for another example, a method with use of various detecting filters may be used.

FIG. 6B illustrates a partial medium edge image SEI as composed of the partial medium edge data. In the partial medium edge image SEI, the edge pixels Egs contained in the partial medium image SI (see FIG. 4F) are specified.

In S340, the CPU 310 conducts a valid edge-pixel determining process. The valid edge-pixel determining process is a process to determine valid edge pixels, which are edge pixels to be used in final matching in S345 among the edge pixels Egt in the template image TI having been specified within the template edge image TEI and the edge pixels Egs in the partial medium image SI having been specified within the partial medium edge image SEI.

Figure 7A:
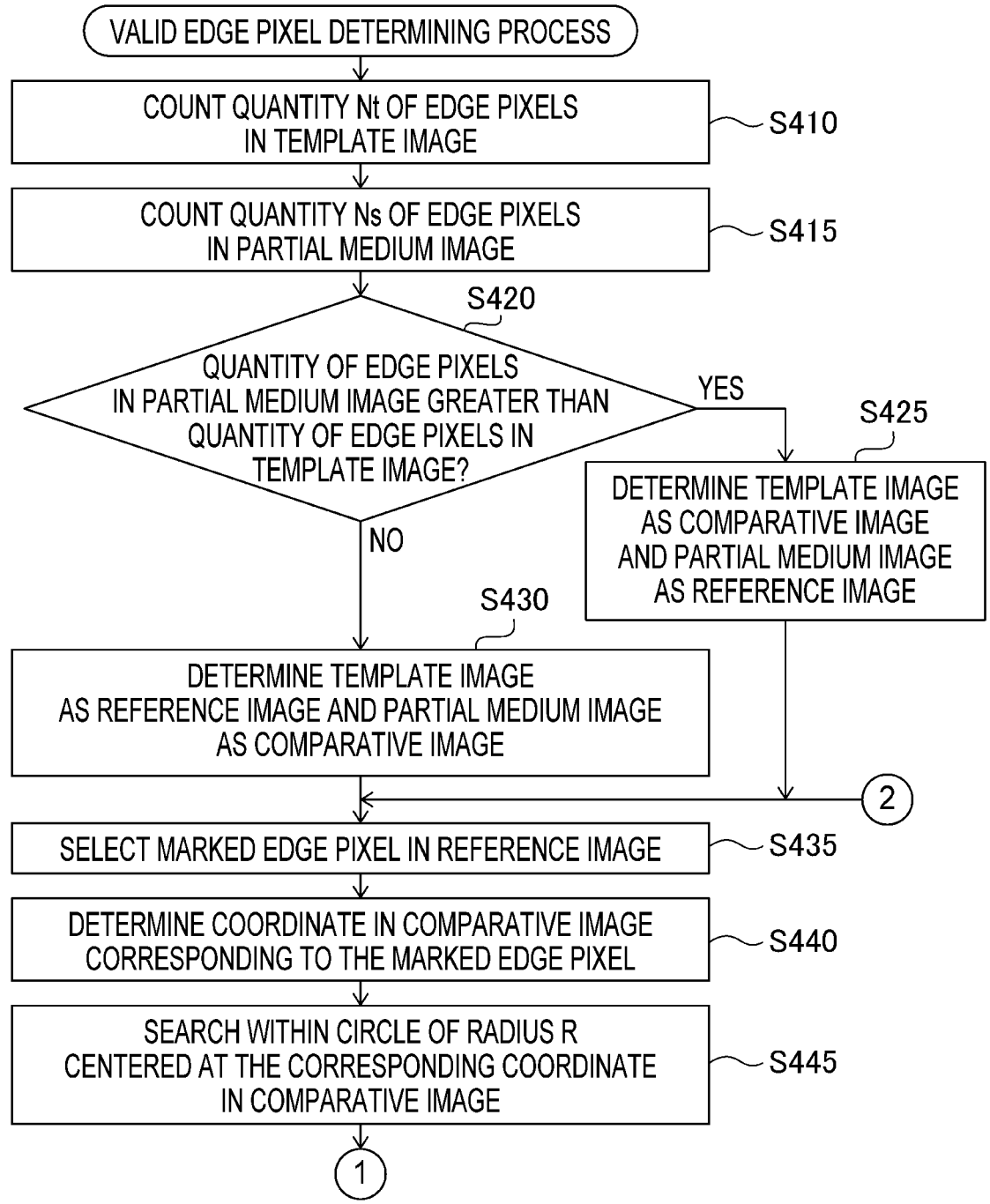
FIGS. 7A-7B are a flowchart to illustrate a flow of steps in a valid edge-pixel determining process to be conducted in the printing system 1000 according to the embodiment of the present disclosure.
Figure 7B:
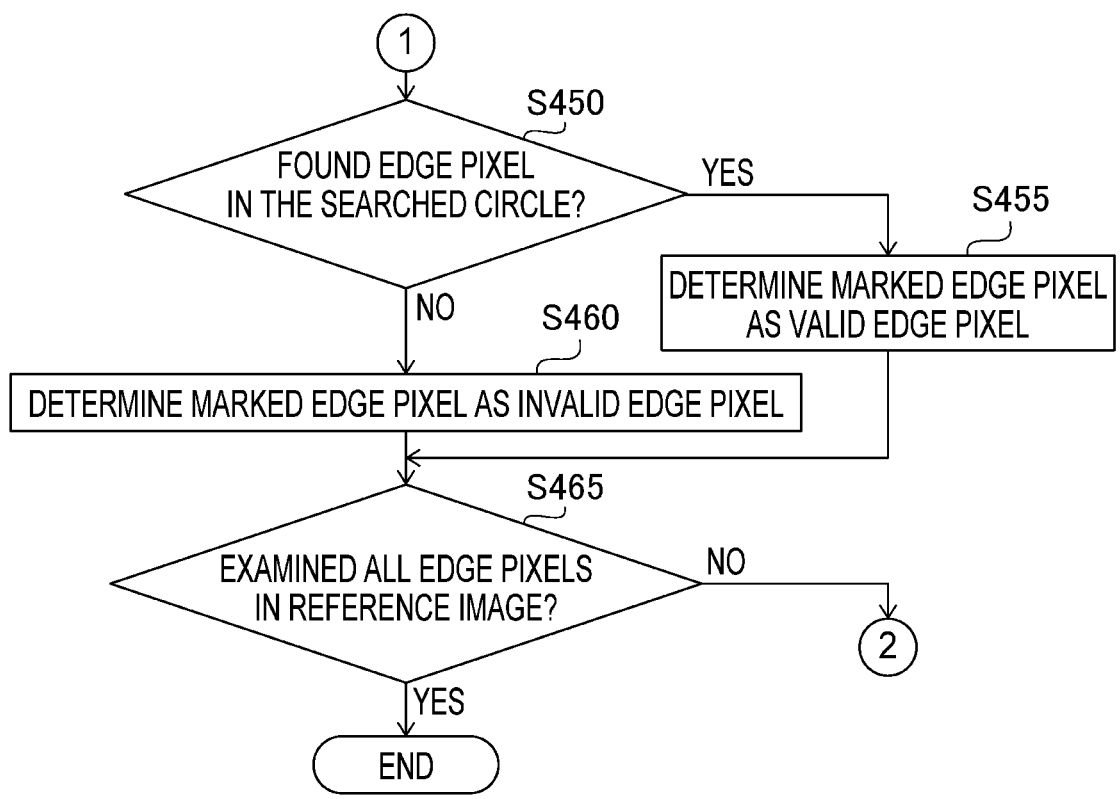

FIGS. 7A-7B are a flowchart to illustrate a flow of steps in the valid edge-pixel determining process. In S410, the CPU 310 counts a number Nt of the edge pixels Egt in the template image TI based on the template edge data. In S415, the CPU 310 counts a number Ns of the edge pixels Egs in the partial medium image SI based on the partial medium edge data.

In S420, the CPU 310 determines whether the number Ns of the partial medium image SI is greater than the number Nt of the edge pixels Egt in the template image TI.

If the number Ns of the edge pixels Egs in the partial medium image SI is greater than the number Nt of the edge pixels Egt in the template image TI (S420: YES), in S425, the CPU 310 determines the template image TI to be a comparative image and the partial medium image SI to be a reference image.

If the number Ns of the edge pixels Egs in the partial medium image SI is smaller than or equal to the number Nt of the edge pixels Egt in the template image TI (S420: NO), in S430, the CPU 310 determines the template image TI to be a reference image and the partial medium image SI to be a comparative image.

In S435, the CPU 310 selects one of the edge pixels in the reference image determined in S425 or S430 as a marked pixel. In S440, the CPU 310 specifies corresponding coordinates, which are coordinates in the comparative image corresponding to the marked pixel in the reference image. The positional relation between the reference image and the comparative image has been determined through the pattern matching in S320 (see FIG. 5). In S445, the CPU 310 searches for edge pixels in a circle having a predetermined radius R centered at the corresponding coordinates in the comparative image based on the edge data of the comparative image. The radius R may be, for example, in a range between several pixels and several tens of pixels.

In S450, based on the result of the search in S445, the CPU 310 determines whether an edge pixel exists in the searched range. If an edge pixel exists in the searched range (S450: YES), in S455, the CPU 310 determines the marked pixel in the reference image as a valid edge pixel. If no edge pixel exists in the searched range (S450: NO), in S460, the CPU 310 determines the marked edge pixel in the reference image as an invalid edge pixel. The edge pixel determined as an invalid edge pixel is excluded from the reference image, in other words, the edge pixel is treated as a non-edge pixel in the reference image. On the other hand, the edge pixel determined as a valid edge pixel is maintained as an edge pixel in the reference image.

In S465, the CPU 310 determines whether all of the edge pixels in the reference image have been examined as the marked edge pixel. If one or more unexamined edge pixels remains in the reference image (S465: NO), the CPU 310 returns to S435 and selects one of the unexamined edge pixel as a new marked edge pixel. If all of the edge pixels in the reference image have been examined (S465: YES), the CPU 310 terminates the valid edge-pixel determining process.

Through the valid edge-pixel determining process, post-process edge data for the reference image, in which the number of pixels is reduced, is generated. For example, when the template image TI is the reference image, post-process template edge data is generated. On the other hand, when the partial medium image SI is the reference image data, post-process partial medium edge data is generated. In the example shown in FIGS. 6A-6C, the template edge image TEI in FIG. 6A is treated as the reference image, and the partial medium edge image SEI in FIG. 6B is treated as the comparative image. Therefore, post-process template edge data composing the processed template edge image LEI as shown in FIG. 6C is generated. In the processed template edge image LEI, the edge pixels encircled by broken lines C1, C2, C3 among the edge pixels Egt in the template image TI (the template edge image TEI) are excluded as invalid edge pixels due to the reason that no neighboring edge pixel exists in the vicinity of the position of the partial medium image SI (the partial medium edge image SEI) corresponding to these edge pixels.

After completing the valid edge-pixel determining process, in S345 (see FIG. 5), the CPU 310 conducts matching between the partial medium image SI and the template image TI with use of Iterative Closest Point (ICP) algorithm. In particular, the matching is conducted based on usable pixels, which are the valid edge pixels in the reference image, i.e., one of the template image TI and the partial medium image SI, and all the edge pixels in the comparative image. In the example of FIGS. 6A-6C, the matching may be conducted based on the usable pixels, which are the edge pixels Egs specified in the partial medium edge image SEI in FIG. 6B and the edge pixels Egs in the processed template edge image LEI in FIG. 6C. The matching may be conducted in accordance with the ICP algorithm by optimization calculation to minimize a distance between each edge pixel in the template image TI and each edge pixel the partial medium image SI.

The matching in S345 is conducted based on an initial position, which is the positional relation determined in the pattern matching in S320 in FIG. 5, in a higher degree of accuracy than the degree of accuracy in the pattern matching in S320 in FIG. 5. For example, the matching in S345 may be performed in a degree of accuracy, in which allowance in the coordinate (offset) is less than one pixel and allowance of the angle is smaller than one degree.

In S350, the CPU 310 determines whether a mean error of the matching in S345 is less than or equal to the threshold TH. The mean error is an average of the distances between the corresponding edge pixels in the partial medium image SI and the template image TI within the positional relation after the matching. When the mean error is less than or equal to the threshold TH, the CPU 310 determines that the matching in S345 was conducted in a substantially high degree of accuracy.

If the mean error is less than or equal to the threshold TH (S350: YES), in S360, the CPU 310 determines the printable area PAs (see FIG. 4D) in the medium image Is based on the result of the pattern matching in S320 and the result of the ICP matching in S345. In particular, the CPU 310 may specify final positional relation between the medium image Is and the template image TI based on the sum of the offset amounts and the sum of the rotation angles after the matching conducted twice, in S320 and S345. The CPU 310 determines an area in the medium image Is where the template image TI overlaps to be the printable area PAs.

If the mean error is greater than the threshold TH (S350: NO), in S355, the CPU 310 conducts an aborting process to abort the matching process. The aborting process may include, for example, a process to display a message informing the worker that the process is to be aborted and a message instructing the worker to restart the operation from the point where the garment S is set once again on the platen 142 through the display 370.

According to the embodiment described above, the CPU 310 may specify the edge pixels Egs (see FIG. 6B) in the medium image Is based on the medium image data (S335 in FIG. 5). The CPU 310 may specify the edge pixels Egt (see FIG. 6A) in the template image TI based on the template image data (S325 in FIG. 5). The CPU 310 may determine the positional relation between the medium image Is and the template image TI in a first, relatively low, degree of accuracy (S320 in FIG. 5). The CPU 310 may determine the usable pixels among the edge pixels Egs, Egt based on the positional relation between the edge pixels Egs, Egt (S340 in FIG. 5) within the determined positional relation between the medium image Is and the template image TI. The usable pixels in the present embodiment are the pixels which are determined as the valid edge pixels within the edge pixels in the reference image and the entire edge pixels in the comparative image. A number of the usable pixels is smaller than the sum of the edge pixels Egs, Egt. In other words, at least some of the edge pixels Egs, Egt are excluded from the usable pixels. The CPU 310 may determine the positional relation between the medium image Is and the template image TI in a second degree of accuracy, which is higher than the first accuracy, with use of the determined usable pixels (S345 in FIG. 5). Therefore, when the positional relation between the medium image Is and the template image TI is determined in the second degree of accuracy, inconvenience such that the positional relation may not be determined effectively with substantial accuracy due to a reason that inadequate edge pixels are used may be restrained. Accordingly, the positional relation between the medium image Is and the template image TI may be specified preferably with the higher degree of accuracy. Moreover, while the inadequate edge pixels may be restrained from being used, inconvenience such that the processing time for the matching process in FIG. 5 may be extended may be restrained. Therefore, for example, time required to specify an object, e.g., the chest pocket Pcs, in the medium image Is may be reduced.

Further, according to the present embodiment, the positional relation may be determined in S320 in the first degree of accuracy with use of the minified medium image data, which is generated from the medium image data processed through the minifying process (S310 in FIG. 5), and the minified template image data, which is generated from the template image data processed through the minifying process (S300 in FIG. 5). Therefore, time required to determine the positional relation in the lower degree of accuracy may be reduced.

Furthermore, according to the present embodiment, the usable pixels in the medium image Is, e.g., the edge pixels Egs in FIG. 6B, may be extracted from the pixels included in the partial medium image SI (FIG. 4F), which is a part of the medium image Is corresponding to the template image TI.

According to this configuration, the usable pixels in the medium image Is may be determined from the pixels included in the partial medium image SI. Therefore, for example, a number of the usable pixels may be reduced compared to a configuration, in which the usable pixels may be determined from the entire medium image Is. Accordingly, the processing time required for the matching in S345 may be reduced.

Moreover, according to the present embodiment, in the valid edge-pixel determining process shown in FIG. 7B, the CPU 310 may determine the edge pixels in the reference image, where the comparative image has the corresponding edge pixels, as the usable pixels (the valid edge pixels), but may not determine the edge pixels in the reference image, where the comparative image does not have the corresponding edge pixels, as the usable pixels (S450-S455 in FIG. 7B). Accordingly, a quantity of the usable pixels may be effectively reduced. As a result, the processing time required for the matching in S345 may be reduced more efficiently.

Meanwhile, an edge pixel in the comparative image corresponding to a specific edge pixel in the reference image is a pixel, which exists within a specific distance, e.g., the radius R, from the specific edge pixel in the reference image within the positional relation determined in the matching between the reference image and the comparative image with the lower accuracy (S440 in FIG. 7A, S445 in FIG. 7B). Therefore, presence or absence of the edge pixels in the comparative image corresponding to the specific edge pixels in the reference image may be determined easily.

Moreover, according to the present embodiment, in the valid edge-pixel determining process in FIG. 7B, when the number Ns of the edge pixels Egs in the partial medium image SI, i.e., partial medium edge image SEI, is greater than the number Nt of the edge pixels Egt in the template image TI, i.e, template edge image TE, (S420: YES in FIG. 7A), the partial medium image SI is treated as the reference image (S425 in FIG. 7A). On the other hand, when the number Ns of the edge pixels Egs in the partial medium image SI, i.e., partial medium edge image SEI, is smaller than the number Nt of the edge pixels Egt in the template image TI, i.e., template edge image TEI, (S420: NO in FIG. 7A), the template image TI is treated as the reference image (S430 in FIG. 7A). Therefore, a number of the usable pixels in an image, which includes a larger number of edge pixels, may be preferably reduced.

Further, according to the present embodiment, the matching in S325 in FIG. 5 in the lower degree of accuracy is a pattern matching process. Therefore, faster and coarse matching may be achieved.

Further, according to the present embodiment, the matching in S345 in FIG. 5 in the higher degree of accuracy is a process using the ICP algorithm. Therefore, matching in the higher degree of accuracy using the effective edge pixels may be achieved.

B. Modified Examples

Examples modified from the embodiment described above will be described in the following paragraphs.

(1) In the embodiment described above, the medium image data representing the garment S is subject image data, in which the printable area is specified in the garment S. However, various data may be the subject image data, in which a predetermined area is specified. For example, in order to specify a marker representing a printable area on a sheet to print an image in the printable area on the sheet, scan data obtained by scanning a sheet may be used as the subject image data. For another example, in order to operate an industrial component through a robot, the industrial component may be determined in a captured image, and the captured-image data may be used as the subject image data.

(2) In the embodiment described above, the pattern matching in S320 in FIG. 5 is conducted using the minified medium image data and the minified template image data. However, optionally, the pattern matching in S320 in FIG. 5 may be conducted using the medium image data, not minified, and the template image data, not minified.

(3) In the embodiment described above, the steps in S335-S345 in FIG. 5 are conducted using the partial medium image data, which is a part of the medium image data. However, optionally, for example, when a difference in size between the medium image data and the template image data is small, the steps in S335-S345 in FIG. 5 may be conducted using the medium image data.

(4) In the embodiment described above, in the processes in S345-S465, one of the partial medium image SI and the template image TI, having a larger number of edge pixels, is treated as the reference image, and the other of the partial medium image SI and the template image TI, having a smaller number of edge pixels, is treated as the comparative image. However, optionally, for example, one and the other of the partial medium image SI and the template image TI may be treated as the reference image and the comparative image, respectively, to conduct the steps in S435-S465, and thereafter, the steps in S435-S465 may be repeated, with the reference image and the comparative image being switched: the other of the partial medium image SI and the template image TI may be treated as the reference image, and the one of the partial medium image SI and the template image TI may be treated as the comparative image.

(5) In S445 in the embodiment described above, the range within the circle with the radius R centered about the marked pixel is searched though as the search range. However, optionally, the reference image may be divided into a plurality of blocks, and one of the blocks containing the marked pixel may be searched through as the search range.

(6) In the embodiment described above, the matching in S320 in FIG. 5 uses pattern matching. However, optionally, matching with use of another algorithm, such as, for example, Chamfer Matching, may be conducted.

(7) In the embodiment described above, the matching in S345 in FIG. 5 uses the ICP algorithm. However, optionally, matching with use of another algorithm may be conducted.

(8) The template registration process in FIG. 3A and the printing process in FIG. 3B may not necessarily be conducted in the terminal device 300 but may be partly or entirely conducted in different device(s). For example, the CPU 210 in the printer 200 or a CPU in the image-capturing device 400 may conduct the template registration process shown in FIG. 3A and the printing process shown in FIG. 3B. In these arrangements, the terminal device 300 may be omitted. For another example, a server connected with at least one of the printer 200, the terminal device 300, and the image-capturing device 400 through the Internet may conduct the template registration process shown in FIG. 3A and the printing process shown in FIG. 3B. In this arrangement, the server may be a so-called cloud server configured with a plurality of computers that may communicate with each other.

(9) For another example, a part of the configuration in the embodiment and the modified examples described above achieved through hardware may optionally be achieved through software, or a part or an entirety of the configuration in the embodiment and the modified examples described above achieved through software may optionally be achieved through hardware.

When some or all of the functions in the present disclosure is achievable through a computer program, the program may be provided in a form of being stored in a computer-readable storage medium, e.g., a non-transitory storage medium. The program may be, when being used, stored in the same storage medium as or a different storage medium (computer-readable storage medium) from the storage medium when it was provided. The computer-readable storage medium may not necessarily be limited to portable storage media such as a memory card and a CD-ROM but may include an internal memory device in a computer and an external memory device connected to a computer such as a hard disk drive.

Although examples of carrying out the invention have been described, those skilled in the art will appreciate that there are numerous variations and permutations of the computer-readable storage medium, the image processing apparatus, and the method for image processing that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

What is claimed is:

1. A non-transitory computer readable storage medium storing computer readable instructions that are executable by a computer, the computer readable instructions, when executed by the computer, causing the computer to:
obtain first image data composing a first image and second image data composing a second image, the second image corresponding to an object;
specify a plurality of first edge pixels in the first image with use of the first image data and a plurality of second edge pixels in the second image with use of the second image data;

determine positional relation between the first image and the second image in a first degree of accuracy;

based on positional relation between the plurality of first edge pixels and the plurality of second edge pixels within the determined positional relation between the first image and the second image, determine a plurality of first usable pixels among the plurality of first edge pixels and a plurality of second usable pixels among the plurality of second edge pixels, a sum of the plurality of first usable pixels and the plurality of second usable pixels being smaller than a sum of the plurality of first edge pixels and the plurality of second edge pixels; and with use of the plurality of first usable pixels and the plurality of second usable pixels, determine positional relation between the first image and the second image in a second degree of accuracy, the second degree being higher than the first degree.

2. The non-transitory computer readable storage medium according to claim 1, wherein the computer readable instructions, when executed by the computer, cause the computer to determine the positional relation between the first image and the second image in the first degree of accuracy with use of minified first image data generated by minifying the first image data and minified second image data generated by minifying the second image data.

3. The non-transitory computer readable storage medium according to claim 1, wherein the computer readable instructions, when executed by the computer, cause the computer to determine the plurality of first usable pixels among pixels included in a partial image, the partial image being a part of the first image corresponding to the second image within the positional relation between the first image and the second image determined in the first degree of accuracy.

4. The non-transitory computer readable storage medium according to claim 1, wherein the computer readable instructions, when executed by the computer, cause the computer to determine the plurality of first usable pixels and the plurality of second usable pixels by at least one of:

determining pixels among the plurality of first edge pixels, to which corresponding second edge pixels exist in the second image, as the first usable pixels, but not determining pixels among the plurality of first edge pixels, to which corresponding second edge pixels do not exist in the second image, as the first usable pixels, and determining pixels among the plurality of second edge pixels, to which corresponding first edge pixels exist in the first image, as the second usable pixels, but not determining pixels among the plurality of first edge pixels, to which corresponding first edge pixels exist in the first image, as the second usable pixels.

5. The non-transitory computer readable storage medium according to claim 4, wherein the second edge pixels existing in the second image corresponding to the first edge pixels are the second edge pixels existing within a predetermined distance from the first edge pixels.

6. The non-transitory computer readable storage medium according to claim 4, wherein the computer readable instructions, when executed by the computer, cause the computer to determine the plurality of first usable pixels and the plurality of second usable pixels by:

when a number of pixels included in a partial image among the first edge pixels is greater than a number of the second edge pixels, the partial image being a part of the first image corresponding to the second image within the positional relation between the first image and the second image determined in the first degree of accuracy, determining the pixels among the plurality of first edge pixels, to which corresponding second edge pixels exist in the second image, as the first usable pixels, but when the number of pixels included in the partial image among the first edge pixels is smaller than the number of the second edge pixels, determining the pixels among the plurality of second edge pixels, to which corresponding first edge pixels exist in the first image, as the second usable pixels.

7. The non-transitory computer readable storage medium according to claim 1, wherein the computer readable instructions, when executed by the computer, cause the computer to use a pattern matching process in determining the positional relation between the first image and the second image in the first degree of accuracy.

8. The non-transitory computer readable storage medium according to claim 1, wherein the computer readable instructions, when executed by the computer, cause the computer to use Iterative Closest Point algorithm in determining the positional relation between the first image and the second image in the second degree of accuracy.

9. An image processing apparatus, comprising:

a memory configured to store data, and a controller configured to:

obtain first image data composing a first image and second image data composing a second image, the second image corresponding to an object;

specify a plurality of first edge pixels in the first image with use of the first image data and a plurality of second edge pixels in the second image with use of the second image data;

determine positional relation between the first image and the second image in a first degree of accuracy;

based on positional relation between the plurality of first edge pixels and the plurality of second edge pixels within the determined positional relation between the first image and the second image, determine a plurality of first usable pixels among the plurality of first edge pixels and a plurality of second usable pixels among the plurality of second edge pixels, a sum of the plurality of first usable pixels and the plurality of second usable pixels being smaller than a sum of the plurality of first edge pixels and the plurality of second edge pixels; and with use of the plurality of first usable pixels and the plurality of second usable pixels, determine positional relation between the first image and the second image in a second degree of accuracy, the second degree being higher than the first degree.

10. A method to process images, comprising:

obtaining first image data composing a first image and second image data composing a second image, the second image corresponding to an object;

specifying a plurality of first edge pixels in the first image with use of the first image data and a plurality of second edge pixels in the second image with use of the second image data;

determining positional relation between the first image and the second image in a first degree of accuracy;

based on positional relation between the plurality of first edge pixels and the plurality of second edge pixels within the determined positional relation between the first image and the second image, determining a plurality of first usable pixels among the plurality of first edge pixels and a plurality of second usable pixels among the plurality of second edge pixels, a sum of the plurality of first usable pixels and the plurality of second usable pixels being smaller than a sum of the plurality of first edge pixels and the plurality of second edge pixels; and with use of the plurality of first usable pixels and the plurality of second usable pixels, determining positional relation between the first image and the second image in a second degree of accuracy, the second degree being higher than the first degree.

\* \* \* \* \*